United States Patent [19]

Jacobson

[11] Patent Number: 4,460,711

[45] Date of Patent: Jul. 17, 1984

[54] INSTANTANEOUS PRODUCTION BY EJECTION OF A FLEXIBLE FOAMED OR SOLID RUBBER MASS ON A SUBSTRATE

[75] Inventor: Amnon Jacobson, Tel-Aviv, Israel

[73] Assignee: Ispra Protection Associates, Herzelia, Israel

[21] Appl. No.: 416,432

[22] Filed: Sep. 9, 1982

[30] Foreign Application Priority Data

Jun. 30, 1982 [IL] Israel .......................... 66169

[51] Int. Cl.³ .......................... C08J 9/30

[52] U.S. Cl. .......................... 521/65; 521/67; 521/71

[58] Field of Search .......................... 521/65, 67, 71; 260/723, 725

[56] References Cited

U.S. PATENT DOCUMENTS 2,719,830 10/1955 Flood et al. .......... 260/723 X 2,848,840 8/1958 O'Brien et al. .......... 260/723 X 3,479,310 11/1969 Dieterich et al. .......... 521/65 X 3,833,524 9/1974 Ward .......... 521/71

4,184,990 1/1980 Reischl et al. .......... 521/65 X

*Primary Examiner*—Lucille M. Phynes
*Attorney, Agent, or Firm*—Ladas & Parry

[57] ABSTRACT

A flexible foamed or solid rubber mass is produced on a substrate by ejection. Two pressurized containers are used, one containing an aqueous latex dispersion together with a pressurized inert propellant and the other an aqueous coagulant solution together with a pressurized propellant and the solutions are ejected simultaneously from two vessels so as to converge on the target and impinge thereon at spots distanced from each other by not more than 50 cm.

The invention also provides an apparatus for carrying out the method.

The invention is applicable whenever it is desired to produce instantaneously a flexible foamed or solid rubber mass on a substrate. One of the important applications of the invention is self-defense and the combatting of riots.

11 Claims, 4 Drawing Figures

INSTANTANEOUS PRODUCTION BY EJECTION OF A FLEXIBLE FOAMED OR SOLID RUBBER MASS ON A SUBSTRATE

The present invention concerns the instantaneous production by ejection of a flexible foamed or solid rubber mass on a substrate.

The instantaneous production of flexible foamed or solid rubber mass on a substrate may be required for a variety of purposes, such as the production of a solid coating for protection against corrosion or for decorative purposes, in particular where creeping of the coating is to be avoided, e.g. on a vertical wall; for fixing a punctured, pressurized rubber vehicle such as a rubber tube or rubber boat; for swift thermal or mechanical insulation of objects; etc.

Yet another important application where speed is of the essence is self-defence and the combatting of riots. In such combat it is essential to incapacitate temporarily an assailant or a group of rioting persons without however causing them any permanent damage. Because of this the authorities impose stringent restrictions on the kind of materials that may be used and a rubber mass, preferably foamed, would quality. However, so far no method for the ejection to a distance of a solution which is capable of instantaneous forming into a rubber mass has been known.

With all these and other applications in view is the object of the present invention to provide method and means for the instantaneous production by ejection of a flexible foamed or solid rubber mass on a substrate.

It is known to produce so-called cellular rubber mass by blowing. By the known methods a rubber colloidal solution is expanded by means of a gas introduced under high pressure into partially cured stock. Completion of the cure at higher temperature and subsequent release of pressure produces the expanded product. This process requires special equipment and considerable capital outlay and the viscosity of the raw materials is too high for ejection to a distance.

It is also known to produce a flexible latex foam rubber mass by the so-called frothing process by which a gas is dispersed in a suitable aqueous latex dispersion together with a surfactant acting as frothing agent, the rubber latex particles are caused to coalesce and form a continuous rubber phase in the water phase and the so formed expanded matrix is cured and dried. Here too, the viscosity of the components is too high for ejection to a practical distance.

All these known methods are cumbersome and slow, the components cannot be ejected to the required distance and the mass created may creep. Consequently these known methods are unsuitable for many of the purposes for which foamed or solid rubber coats could otherwise be used.

The present invention aims at making use of natural and synthetic latex. Natural latex is available in the form of emulsions and colloidal solutions containing preservatives such as, for example, potassium hydroxide; sodium sulfite; ammonia preferably in combination with another substance such as boric acid, lauric acid, sodium pentachlorophenyl, zinc dialkyldithiocarbonate; and the like, all this being known per se. It is equally known that colloidal solutions and emulsions of natural or synthetic latex can be stabilized by various ions such as carboxylate ions, protective colloids such as plant hydrocolloids, proteins, caseins, starches, polyvinyl alcohols, surfactants, etc. All such colloidal solutions and emulsions are applicable in accordance with the present invention and any such solution or emulsion will be referred to hereinafter for simplicity as "aqueous latex dispersion".

It is known that the latex in an aqueous latex dispersion can be caused to coagulate by destroying the dispersion forming forces by the addition of a coagulant. The chemical nature of such a coagulant depends on the nature of the dispersion, i.e. whether it is a colloidal solution or an emulsion, and on the kind of stabilizer, if any, present therein. In accordance with the present invention it has now been found that coagulation and ensuing formation of a foamed or solid rubber mass can be instantaneous if an aqueous latex dispersion and an aqueous coagulant solution are thrown separately in the form of discrete jets on a target where they are caused to meet so that a foamed or solid rubber mass forms in situ.

Based on these observations the invention provides a method for the instantaneous production of a foamed or solid rubber mass on a target, comprising introducing an aqueous latex dispersion together with a pressurized inert propellant into a first pressure vessel fitted with an ejection nozzle and control means; introducing an aqueous solution of a coagulant together with a pressurized propellant into a second pressure vessel fitted with an ejector nozzle and control means; placing said first and second vessels at a predetermined distance from the target in such positions that liquid jets ejected from said vessels will converge on the target and impinge thereon at spots distanced from each other by not more than 50 cms; and simultaneously actuating the control means of said vessels thereby to cause the ejection of liquid jets therefrom on said target.

Aqueous latex dispersions used in accordance with the invention may or may not comprise stabilizers.

The pressurized propellant used in accordance with the invention in said first and second pressure vessels may be a low boiling liquefied gas or a nonliquefied compressed gas. Where the propellant in the first vessel is a low boiling liquefied gas the rubber meass formed on the target will be foamed. Where, on the other hand, the propellant in the first vessel is a nonliquefied compressed gas the rubber mass formed on the target will as a rule be solid.

In one embodiment of the invention the coagulant solution in said second pressure vessel is an aqueous acidic solution. The nature of the acid used in accordance with such an embodiment is not critical. Where the invention is used for temporarily incapacitating persons, the acid should be of such nature as not to harm humans and citric acid has been found to be particularly suitable for the purposes. To prevent bacterial growth in the citric acid solution it is possible to add from 0.01 to 10% by weight of an antibacterial agent, e.g. thymol.

In accordance with another embodiment of the invention the coagulant solution is an aqueous solution of at least one compound of a bivalent metal ion such as Ca, Mg, Sr, Ba, Zn, a representative example of such a compound being $CaCl_2$.

In yet another embodiment the coagulant is a water miscible organic solvent such as, for example, ethyl alcohol or acetone.

Mixtures of two or more of any of the abovementioned coagulants may also be employed.

The qualification that the propellants employed in accordance with the invention in said pressure vessels should be inert means that they should not react with any of the components of the solutions in said vessels during the entire storage life.

The invention also provides an apparatus for carrying out the above method, comprising two pressure vessels fitted each with an ejector nozzle and adapted each to hold a mixture of a liquid and a pressurized inert propellant, control means for controlling the ejection of liquid from said vessels and means for the simultaneous actuation of said control means.

If desired, the aqueous latex dispersion and/or the aqueous coagulant solution may comprise a crosslinking agent. Also if desired a surfactant may be included in the aqueous latex dispersion to enhance frothing and foaming.

In practising the invention the ejected aqueous latex dispersion and aqueous coagulant solution impinge simultaneously on the target and mix thereon with the instantaneous formation of a foamed or solid rubber mass. Where the propellant in the first vessel is a low boiling liquefied gas, it fulfills the double function of propellant and frothing agent.

Thus, in accordance with the invention the aqueous latex dispersion retains a low viscosity until it impinges on the target where frothing and foaming or a simple purification occurs instantaneously. In this way reliable performance is ensured.

Examples of low boiling liquefied gases that can be used as propellants in accordance with the invention are various organic gases such as, for example, fluorinated and/or chlorinated hydrocarbons, e.g. dichloro difluoro methane. Examples of non-liquefied compressed inert gases that can be used as propellants in accordance with the invention are nitrogen, argon and helium, which can be used either by themselves or in combination with a liquefied organic gas. Where such inert gases are used by themselves no foaming or frothing occurs and the resultant rubber mass is solid.

Any liquefied or compressed gas used as propellant in accordance with the invention must be compatible with the aqueous latex dispersion to avoid any agglomeration of dispersed latex particles during storage life. Thus, the gas should be very pure and should not go into any chemical reaction during the lifetime of the aqueous latex dispersion. The relative proportion of a propellant in the aqueous latex dispersion may be up to 50% by weight.

The propellant for the aqueous coagulant solution may be the same as or different from that used for the aqueous latex dispersion and the relative proportion may again vary between 1–50% by weight.

The storage pressures in the two pressure vessels are not critical. The minimum pressure should be such that the liquid phases are ejected at sufficient speed and force to reach the target. By way of example, pressure from 1 to 12 atm. gauge for the aqueous latex dispersion and from 0.25 to 12 atm. gauge for the coagulant solution have been found to be practical.

The diameters of the nozzles of the two pressure vessels may also vary according to requirements and be, for example, from 0.5 to 30 mm and the distance from the target may, for example, be 2 m.

The relative proportions at which the two aqueous phases mix on the target are controllable by suitably selecting the diameters of the two nozzles and the storage pressure in the two vessels. The relative proportion will depend on the desired properties and the w:w ratio between the aqueous latex dispersion and the coagulant solution when impinging on the target may vary between 40:1 to 1:10.

In operation the two vessels are so positioned that the ejected streams converge in the direction of the target and impinge on the latter at spots not distanced from each other by more than 50 cms. Where the target is a human face the mass that forms sticks on the skin or shrinks around any existing hair situated on the face, e.g. the lids and eyebrows, with the result that the vision of the hit person is obscured and the removal of the rubber mass from his face requires at least a few seconds or even minutes during which time that person remains incapacitated.

The invention is illustrated by the following examples without being limited thereto.

EXAMPLE 1—LATEX SOLUTION

An aqueous natural or synthetic latex dispersion containing at 25° C. from 30 to 70% by weight of rubber, 0.1 to 5% by weight of stabilizer, e.g. protein, 0.1 to 10% by weight of preserver, e.g. $NH_3$ and/or from 1 to 20% by weight of $Na_3CO_3$ acting as buffer and yielding a pH>6, and 1 to 50% by weight of $CCl_2F_2$ as propellant. Optionally the solution may also contain 5 to 60% by weight of the glycerin; 0.1 to 50% by weight of a surfactant such as for example sodium lauril sulphate; and from 1 to 60% by weight of a cross-linking agent, e.g. trimethylamine.

EXAMPLE 2—COAGULANT SOLUTION

A suitable coagulatn solution contains 0.2 to 60% by weight of citric acid or another coagulant capable to collapse the above stabilized aqueous latex dispersion, 1 to 50% by weight of $CCl_2F_2$ as propellant, as well as various buffers and cross-linking agents such as for example, N,N-dimethylformamide, tolylen diisocyanate and trimethylamine. In case of citric acid 0.1 to 10% thymol is added to prevent bacteria growth.

EXAMPLE 3—COAGULANT SOLUTION

A suitable aqueous coagulant solution contains 0.2–50% by weight of $CaCl_2$, 1–50% by weight of $CCl_2F_2$ as propellant as well as various buffers and cross-linking agents as in Example 2.

Instead of $CaCl_2$ one or more compounds of a bivalent metal such as Ca, Mg, Sr, Ba, Zn capable to collapse a latex solution, e.g. according to Example 1 may be used.

EXAMPLE 4—COAGULANT SOLUTION

A suitable coagulant solution contains 0.2–30% by weight of a water miscible organic solvent such as acetone, ethanol, etc., capable to collapse a stabilized aqueous latex solution, e.g. the solution of Example 1.

EXAMPLE 5—MIXED COAGULANT SOLUTIONS

Two or more of the coagulant solutions according to any of the foregoing Examples 2–4 may be mixed in any desired proportions.

The invention is further illustrated by way of example in the accompanying drawings in which.

Figure 1:
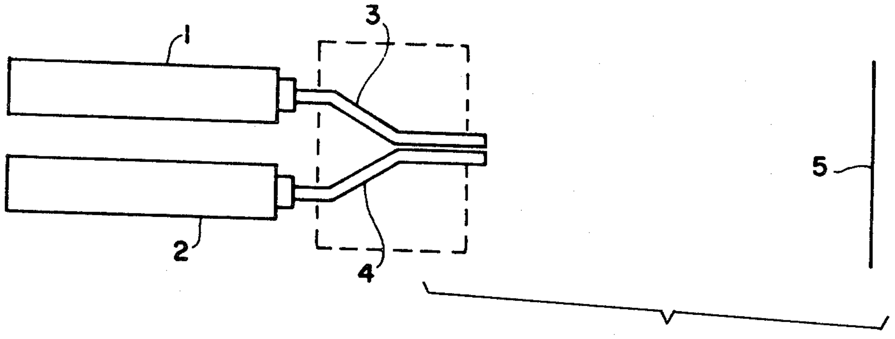
FIGS. 1 and 2 show diagrammatically two embodiments of an apparatus according to the invention.

The apparatus according to FIG. 1 comprises two oblong cylindrical pressure vessels 1 and 2 fitted respectively with ejection pipes 3 and 4 carrying at their discharge ends ejection nozzles (not shown). The ejection pipes may be incorporated into one block (dotted line). The apparatus further comprises control means (not shown) for each of ejection pipes 3 and 4 and means (also not shown) for the simultaneous actuation of such control means. In operation the apparatus is placed up to 10 m from a target 5 and the mutual position is such that the liquid jets ejected through ejection pipes 3 and 4 converge in the direction of target 5 and impinge thereon on spots distanced from each other by not more than 50 cms.

Figure 2:
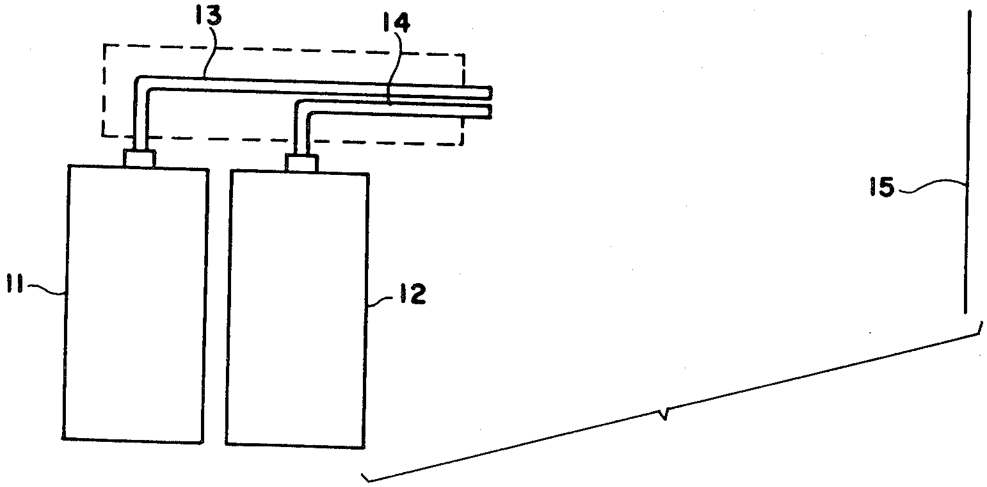

The apparatus according to FIG. 2 is similar in principle but of a slightly different design. It comprises vessels 11 and 12 of a vertical cylindrical design and suitable for mounting on a platform, e.g. the roof of an armoured vehicle used for combatting riots. Vessels 11 and 12 comprise respectively ejection pipes 13 and 14 fitted with nozzles, control means and actuation means similar as in the embodiment of FIG. 1 and all of which are not shown. Ejection pipes 13 and 14 are so positioned that the liquid jets ejected therefrom converge on target 15 to impinge thereon at spots distanced from each other by not more than 50 cms.

Figure 3:
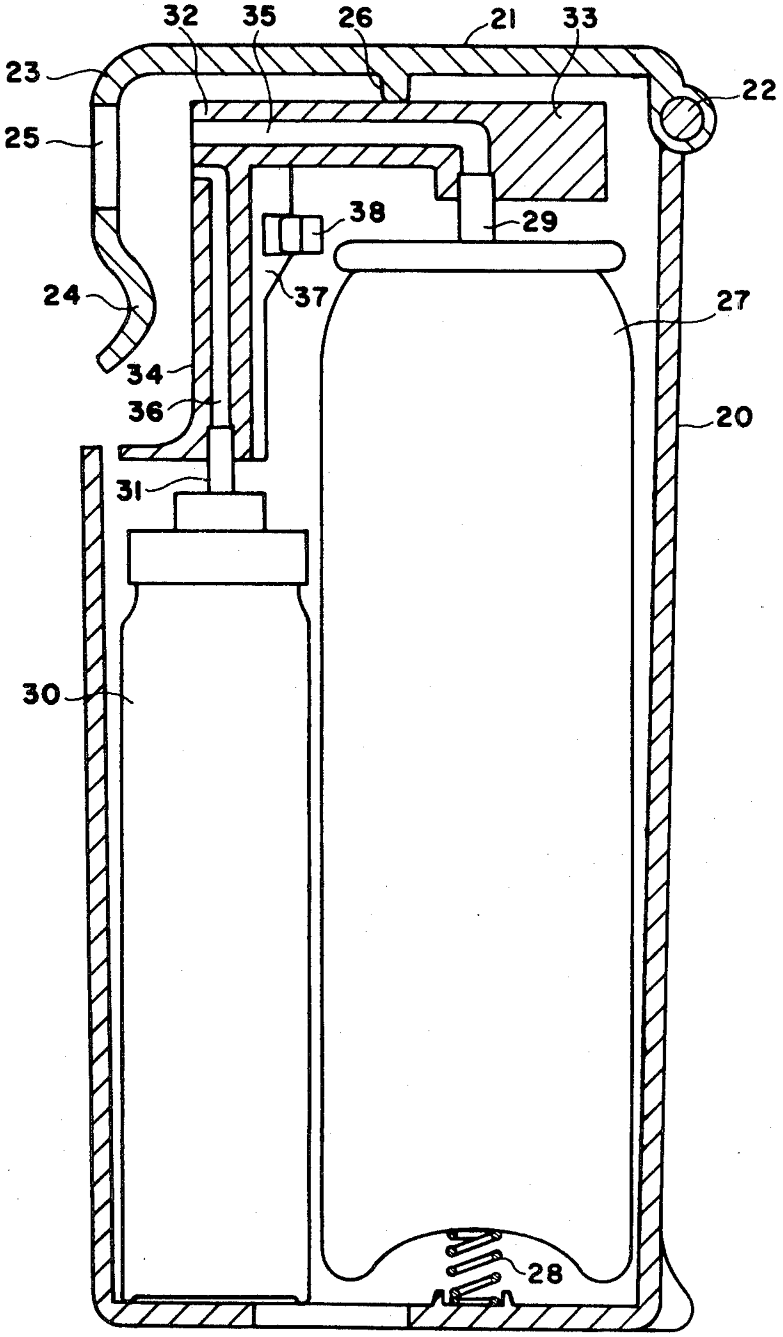
FIG. 3 is a cross-section of one embodiment of a pocket size apparatus according to the invention serving for self-defence.

FIG. 3 shows a cross-section through a pocket size apparatus according to the invention serving for self-defence. The apparatus illustrated comprises a casing 20 fitted with a cap-shaped lid 21 hinged to the casing at 22. Lid 21 has depending side walls of which only the front portion 23 is shown. The depending front portion 23 has a trigger-shaped part 24 and an opening 25 for the passage of ejected liquid jets. At its lower face lid 21 comprises a protuberance 26 which also serves for actuation as will be described below.

Casing 20 accommodates a first pressure vessel 27 which rests on a compression spring 28 and which is fitted with a pressure valve 29 of the kind that is pressed upward in the shutting position by the pressure prevailing inside the vessel and which can be opened by depression. Pressure vessel 27 serves for holding a pressurized aqueous latex dispersion together with a pressurized inert frothing propellant.

Casing 20 further accommodates a second pressure vessel 30 fitted with a pressure valve 31 of a similar design as valve 29 and vessel 27. Pressure vessel 30 serves for holding an aqueous coagulant solution together with a pressurized propellant.

The apparatus further comprises a head block 32 having a horizontal portion 33 and a vertical portion 34. The horizontal portion 33 comprises an L-shaped channel 35 whose shorter, vertical portion merges into a socket which accommodates the valve 29 of vessel 27 while its horizontal portion serves as ejection nozzle for vessel 27. Likewise, the vertical portion 34 of head block 32 comprises an L-shaped channel 36 whose longer, vertical portion merges into a socket which accommodates the valve 31 of vessel 30, while its horizontal portion serves as ejection nozzle for vessel 30. The ejection nozzle terminals of channels 35 and 36 are opposite the opening 25 of the depending front portion 23 of lid 21.

The head block 32 further comprises a rib 37 with a bore accommodating a safety pin 38 which is further accommodated by two registering holes in the depending side portions of lid 21 (not shown). Consequently, as long as pin 38 is in position lid 21 cannot be depressed.

The operation of this device is as follows:

Upon extraction of safety pin 38 the device can be triggered by pressing the trigger-shape portion 24 of lid 21 so that the lid swings clockwise round the hinge 22. In consequence by the action of the protuberance 26 the head block 32 is depressed which in turn causes the depression of both valves 29 and 31. In consequence two concurrent jets are ejected from the ejection nozzle terminals of bores 35 and 36, which jets emerge via opening 25. The jet ejected through bore 35 arrives from pressure vessel 27 and consists of an aqueous latex dispersion and the jet ejected through bore 36 arrives from pressure vessel 30 and consists of an aqueous coagulant solution. The design of the bores 35 and 36 is such that their horizontal terminal portions are slightly converging so that the emerging jets impinge at close proximity on the face of an assailant at a predetermined range, say about 2–5 m. In consequence a foamed rubber mass forms on the face of the assailant and covers his eyes, by which he becomes temporarily incapacitated.

For replacing the pressure vessels 27 and 30 lid 21 is lifted by swinging it anti-clockwise, head 32 is removed, spent pressure vessels 27 and 30 are withdrawn and new vessels are inserted instead, whereafter head 32 and lid 21 are returned to their respective operative positions.

Figure 4:
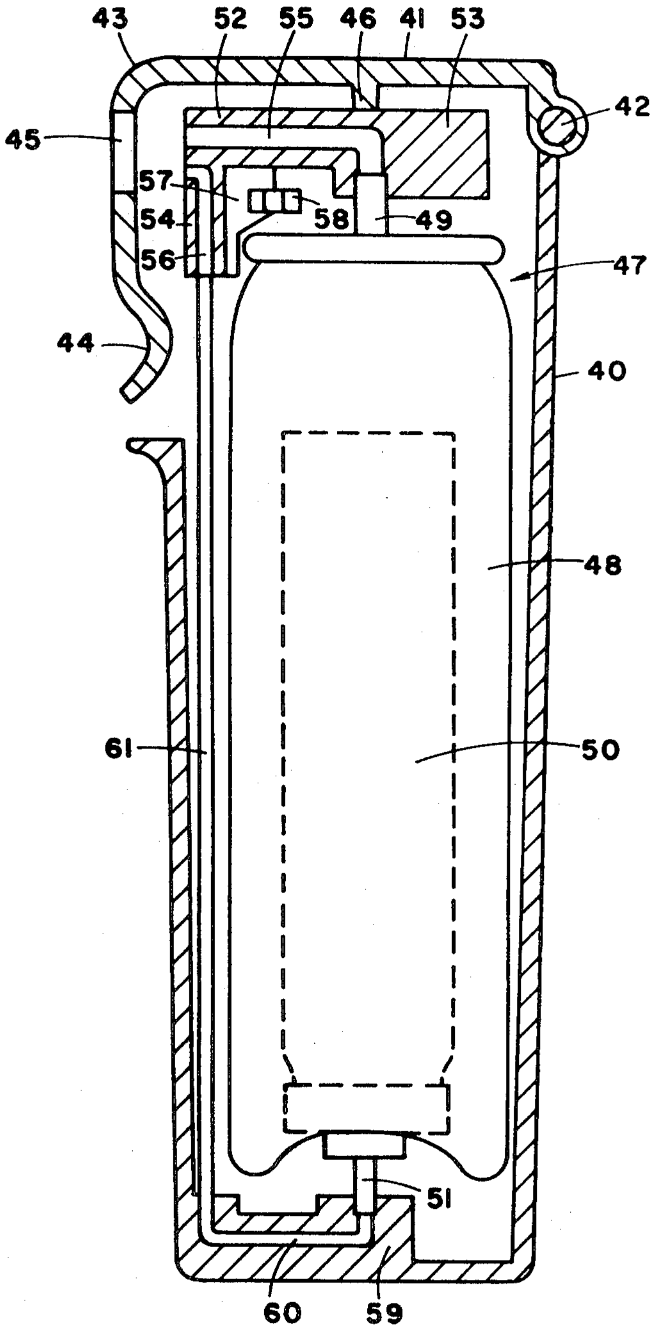
FIG. 4 is a cross-section of another embodiment of a pocket size apparatus according to the invention serving for self-defence.

The apparatus shown in FIG. 4 is similar to the one of FIG. 3 but more compact. It comprises a casing 40 fitted with a cap-shaped lid 41 hinged to the casing at 43. Lid 41 has depending sidewalls of which only the front portion 43 is shown. The depending front portion 43 has a trigger-shaped part 44 and an opening 45 for the passage of ejected liquid jets. At its lower face lid 41 comprises a protuberance 46 which also serves for actuation similar as in the embodiment of FIG. 3.

Casing 40 accommodates a compact pressure vessel assembly 47 comprising a first pressure vessel 48 fitted with a pressure valve 49 and coaxially mounted therein a second pressure vessel 50 fitted with a pressure valve 51 projecting outside the bottom of vessel 48. Similar as in FIG. 3 pressure valves 49 and 51 are pressed outside into the shutting position by the pressure prevailing inside the vessels can each be opened by forced depression against such pressure. The outer, larger pressure vessel 48 serves for holding a pressurized aqueous latex dispersion together with a pressurized inert frothing propellant and the inner, smaller pressure vessel 50 serves for holding an aqueous coagulant solution together with a pressurized propellant.

The apparatus further comprises a head block 52 having a horizontal portion 53 and a vertical portion 54. The horizontal portion 53 comprises an L-shaped channel 55 whose shorter, vertical portion merges into a socket which accommodates the valve 49 of vessel 48 while its horizontal portion serves as ejection nozzle for vessel 48. Likewise, the vertical portion 54 of head block 52 comprises an L-shaped channel 56 whose lower, vertical portion merges into a socket serving as intake for pressurized coagulant solution arriving from vessel 50 while the horizontal portion serves as ejection nozzle for such solution. The ejection nozzle terminals of channels 55 and 56 are opposite the opening 45 of the depending front portion 43 of lid 41.

The head block portion 52 further comprises a rib 57 with a bore accommodating a safety pin 58 which is further accommodated by two registering holes in the depending side portions of lid 41 (not shown). Consequently, as long as pin 58 is in position lid 41 cannot be depressed.

At the bottom of casing 40 there is provided a block 58 having a U-shaped channel 59 whose right hand side vertical portion merges into a socket accommodating pressure valve 51 of vessel 50 while the left hand side vertical portion merges into a socket that accommodates a vertical duct 60 whose upper end is accommodated by the socket at the end of the vertical portion of channel 54 of head block 52.

The operation of this device is similar to that of the device of FIG. 3 and need therefore not be explained in detail. When the trigger-shaped portion 44 of lid 41 is pressed upon extraction of the safety pin 58 the head block 52 is depressed which in turn causes the depression of valve 49 and simultaneously therewith the depression of the entire container assembly 47 which causes a movement of the valve 51 relative to container 50 which is tantamount to a depression of the valve into the container. In consequence valve 51 is also opened. As a result of all this an aqueous latex dispersion emerges through valve 49 and bore 55 and an aqueous coagulant solution emerges through valve 51, channel 59, duct 60, and duct 56 of head block 52. In consequence, two concurrent jets are ejected from the ejection nozzle terminal of bores 55 and 56, the design of the bores being again such that their horizontal terminal portions are slightly converging so that the emerging jets impinge at close proxmity on the face of an assailant at a predetermined range of say about 2-5 m. In consequence, a formed rubber mass forms on the face of the assailant and covers his eyes, by which he becomes temporarily incapacitated.

For replacing the pressure vessel assembly 47 lid 41 is lifted by swinging it anti-clockwise, head block 52 is removed, the spent assembly 47 is withdrawn and a new one is inserted instead, whereafter head block 52 and lid 41 are returned to their respective operative positions. It is thus seen that this embodiment has the advantage of being more compact which enables a reduction of size and requiring only one refill unit instead of two.

What we claim is:

1. A method for the instantaneous production of a foamed or solid rubber mass on a target, comprising introducing an aqueous latex dispersion together with a pressurized inert propellant into a first pressure vessel fitted with an ejection nozzle and control means; introducing an aqueous solution of a coagulant together with a pressurized propellant into a second pressure vessel fitted with an ejector nozzle and control means; placing said first and second vessels at a predetermined distance from the target in such positions that liquid jets ejected from said vessels will converge on the target and impinge thereon at spots distanced from each other by not more than 50 cms; and simultaneously actuating the control means of said vessels thereby to cause the ejection of liquid jets therefrom on said target.

2. A method according to claim 1 employed for self-defence and combatting riots.

3. A method according to claim 1 wherein said coagulant is an aqueous acid solution.

4. A method according to claim 3 wherein said acid is citric acid.

5. A method according to claim 4 wherein the citric acid solution contains an antibacterial agent.

6. A method according to claim 1 wherein said coagulant solution is an aqueous solution of at least one component of a bivalent metal ion.

7. A method according to claim 6 wherein said bivalent ion is a member selected from ions of the group of metals Ca, Mg, Sr, Ba, Zn.

8. A method according to claim 1 wherein said coagulant solution comprises a water miscible organic solvent.

9. A method according to claim 1 wherein a mixture of at least two of the coagulants is used.

10. A method according to claim 1 wherein any of said aqueous latex dispersion and aqueous coagulant solution contain a cross-linking agent.

11. A method according to claim 1 wherein said aqueous latex dispersion contains a surfactant.

* * * * *